United States Patent

Hedstrom

[15] 3,638,442
[45] Feb. 1, 1972

[54] CRYOGENIC LIQUID LEVEL CONTROL

[72] Inventor: Albert V. Hedstrom, Pinole, Calif.
[73] Assignee: Almac Cryogenics, Inc., Oakland, Calif.
[22] Filed: Aug. 1, 1968
[21] Appl. No.: 749,363

[52] U.S. Cl. .................................................. 62/49, 137/386
[51] Int. Cl. ..................................................... F17c 7/00
[58] Field of Search .................... 62/49; 91/52; 137/386, 389,
137/392, 393, 400, 413, 414

[56] References Cited

UNITED STATES PATENTS

| 2,619,107 | 11/1952 | Graham | 137/393 |
| 2,756,765 | 7/1956 | Agule et al. | 137/386 |
| 3,089,512 | 5/1963 | Julien | 91/52 X |
| 3,262,280 | 7/1966 | Chaney | 62/49 |

FOREIGN PATENTS OR APPLICATIONS

| 1,501,801 | 10/1967 | France | 62/49 |

Primary Examiner—Robert G. Nilson
Attorney—Limbach, Limbach & Sutton

[57] ABSTRACT

A pneumatically operated automatic control for the liquid level of cryogenic liquids in which a start valve controls the starting of cryogenic liquid delivery which continues until the level of the cryogenic liquid reaches a temperature-sensitive sensor. A delivery valve for the cryogenic liquid is held open by a body of entrapped gas under pressure which is first pressurized by the start valve. A metering valve may be employed to release the entrapped gas at a predetermined rate to limit the duration of each filling cycle regardless of the height of liquid level reaches after operation of the start valve. A second temperature-responsive means may be employed for operating the start valve to provide automatic incremental control of liquid level between minimum and maximum levels, and the delivery valve may be employed for controlling the main line valve where evaporative cooling in the main line valve has a tendency to condense pressurized gas at the control port of the line valve.

7 Claims, 5 Drawing Figures

INVENTOR.
ALBERT V. HEDSTROM
BY Limbach & Limbach
ATTORNEYS

INVENTOR.
ALBERT V. HEDSTROM
BY
Limbach & Limbach
ATTORNEYS

INVENTOR.
ALBERT V. HEDSTROM
BY
Limbach & Limbach
ATTORNEYS

CRYOGENIC LIQUID LEVEL CONTROL

This invention relates to an automatic liquid level control for controlling the flow of cryogenic liquids such as liquid nitrogen from a pressurized supply of the liquid to a container while automatically controlling the liquid level between minimum and maximum levels. The device eliminates on and off chatter of the main dispensing valve by operating incrementally to deliver a full stream of cryogenic liquid from the time a start valve is operated until the time that the liquid level in a container reaches a temperature sensor; after the liquid level has reached the temperature sensor, further cryogenic liquid is not dispensed until the next operation of the start valve even if the liquid level falls below the temperature sensor.

In the preferred embodiment of the invention, the start valve is operated automatically by a second temperature sensor which is set at a minimum level in a container to which the liquid level is permitted to fall.

The control apparatus of this invention operates by providing an entrapped body of pressurized fluid which is initially pressurized by operation of the start valve and holds a delivery valve in a valve open condition until the entrapped body of fluid is vented in response to operation of the maximum level temperature sensor. Since the duration of each filling cycle is controlled by the time interval when the entrapped body of fluid is contained, the maximum duration of each filling cycle may be controlled by venting this entrapped body of fluid through a metering valve. The metering valve vent may be used with the high liquid level sensor to provide both time and liquid level controls on each filling cycle. The metering vent valve may also be used without the high liquid level sensor to provide time control on the filling cycle without maximum liquid level control.

Many commercially available cryogenic liquid control valves develop substantial evaporative cooling or cryosorbtion in the body of the valve, particularly where the valve is installed between a pressurized supply of cryogenic liquid and a discharge nozzle which is open to atmospheric pressure. Where a main line valve of this type is employed, the main line valve does not function satisfactorily as the delivery valve of this invention because the evaporative cooling in the line valve tends to liquify pressurized gas in the entrapped body of fluid holding the valve open so that the evaporative cooling dissipates the pressure of the entrapped fluid thereby closing the main line valve prematurely. The same result may occur with certain types of cryogenic liquid valves which provide an intentional leakage between the fluid passages of the valve and the pressure control port of the valve.

In accordance with the preferred embodiment of this invention, a delivery valve is held open by the entrapped body of pressurized fluid, and the output of the delivery valve is connected to the control port of one of these commercially available main line valves. Evaporative cooling in the main line valve has a tendency to liquify gas at the control port of the main line valve, but pressure at the control port of the main line valve is maintained through the delivery valve. At the same time, there is not sufficient flow of fluid through the delivery valve, with pressure differential across the delivery valve to provide sufficient evaporative cooling in the delivery valve to liquify gas in the entrapped body of pressurized fluid.

The control apparatus of this invention is operated in its entirety by pneumatic controls which may be integrated into a single control unit, and no electrical controls are provided which would require connection to external power. The entire operating power for this apparatus is derived from the fluid pressure in the pressurized source of cryogenic liquid being dispensed together with the operating forces being developed by temperature responsive means which sense the liquid level of a cryogenic liquid in a container being filled.

As indicated above, each incremental cycle of delivery of cryogenic liquid is instituted by operation of a start valve. The start valve may be operated automatically by a minimum liquid level control sensor, but where this minimum liquid level control sensor is omitted, the identical apparatus may be employed as a one-shot automatic filling control where the metering valve or the maximum level temperature sensor is employed for automatically shutting off the delivery of liquid after initial delivery of liquid is started manually be manual operation of the start valve.

Other features and advantages of the invention will become apparent from the following description read in conjunction with the attached drawings in which.

Figure 1:
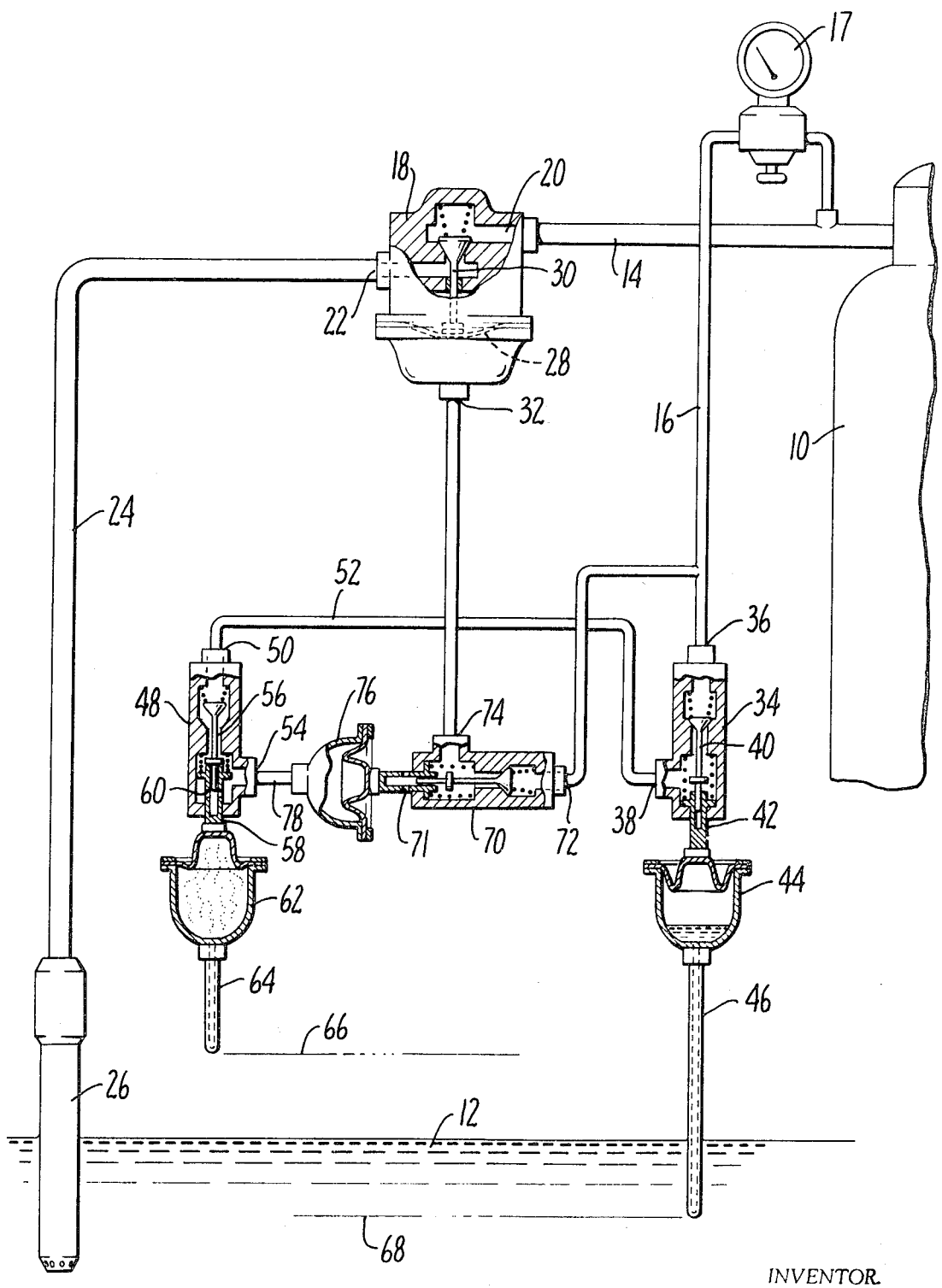
FIG. 1 is a schematic view of the preferred form of control apparatus of this invention illustrating that apparatus in the condition where the liquid level in a container has fallen part way from a maximum level toward a minimum level.

Referring now in detail to the drawings and particularly to FIG. 1, the apparatus therein illustrated is an automatic control for dispensing cryogenic liquids such as liquid nitrogen from a pressurized source 10 of the liquid such as a conventional Dewar flask to a body of liquid 12 in a container not shown. The source 10 has a delivery conduit 14, usually provided with a shutoff valve, and a branch line 16 is connected to the supply conduit 14 through the pressure gauge 17. The delivery conduit 14 of the supply 10 extends into the container 10 and to the bottom of the container so that pressure in the head space of the container forces cryogenic liquid through the delivery conduit 14, and as the apparatus is illustrated in FIG. 1, the branch line 16 receives liquid nitrogen from the main delivery conduit 14. In operation of the apparatus, cryogenic liquid entering the branch conduit 16 is generally vaporized by the latent heat of the conduit 16 and thermal conduction away from the conduit 16 since there is an insufficient flow of fluid through the conduit 16 to keep the temperature of the conduit 16 at the boiling point of the cryogenic liquid. Conventional containers like the container 10 often include a second delivery conduit (not shown) communicating with the head space over the liquid in the container where pressurized gas in the head space is impounded. Where such a container is employed, the branch conduit 16 can be connected to the head space of the container instead of to the delivery conduit 14.

A main line valve 18 has a supply opening 20 connected to the conduit 14 and a discharge opening 22 connected by a conduit 24 to a discharge nozzle 26. The line valve 18 is of the type mentioned above having a bellows 28 engaging a valve stem 30 and a control port 32 where pressurized fluid at the control port 32 causes the valve 30 to move to a valve open position, but cryogenic liquid flow through the valve, particularly where there is a pressure differential across the valve, causes sufficient evaporative cooling in the valve that pressurized gas between the control port 32 and the bellows 28 may be liquified.

A start valve 34 has a supply opening 36 connected to the branch line 16 and a delivery opening 38 with a spring-loaded valve element 40 for closing off the supply opening and a spring-loaded valve plunger 42 extending through the body of the start valve 34 for opening the valve element 40.

A temperature-responsive device comprising a bellows 44 and a capillary tube 46 is mounted adjacent to the body of the valve 34 so that expansion of the bellows 44 presses against the element 42 and opens the valve 40. The bellows 44 and capillary tube 46 are a conventional element in which the bellows 44 may be made in a variety of shapes. The lower end of the capillary tube 46 is sealed and forms a temperature sensor, and the upper end of the capillary tube 46 communicates with the interior of the bellows 44. The interior of the bellows 44 and the interior of the capillary tube 46 are filled with a gas such as nitrogen or carbon dioxide which has a boiling point below ambient atmospheric temperatures but not lower than the boiling point of the cryogenic liquid 12 which is being sensed by the temperature responsive means. When the capillary tube 46 is not in contact with the cryogenic liquid 12, the gas inside of the capillary tube 46 and bellows 44 vaporizes expanding the bellows 44 to press upwardly on the element 42, and when the capillary tube 46 contacts the cryogenic liquid 12, the gas inside the capillary tube liquifies creating a vacuum condition inside the bellows 44 which contracts the bellows 44.

It should be noted that the element 42 which operates to unseat the valve 40 does not have any vent passageway through it in contradistinction to valve elements described below.

A high-level control valve 48 has a supply opening 50 connected by conduit 52 to the delivery opening of start valve 34. The valve 48 also has a delivery opening 54, valve stem 56 and a valve operator 58 similar to corresponding parts in the start valve 34. However, the valve operator 58 is provided with an internal bore and lateral vent ports 60 by which the interior of the valve 48 is vented when the valve operator 58 is moved outwardly from the valve under the influence of its biasing spring. The high-level control valve 48 is operated by a bellows 62 and capillary tube 64 similar in construction to the bellows and capillary tube 44 and 46 except that the capillary tube 64 is adjusted to be positioned at the maximum level 66 to which cryogenic liquids are to be filled in the container whereas the capillary tube 46 is adjusted to the minimum level 68 to which the level of cryogenic liquid in the container is permitted to fall.

A delivery valve 70 identical in construction to the valve 48 has supply and delivery openings 72 and 74, respectively, connected respectively to the branch conduit 16 and the control port 32 of the main line valve 18.

The delivery valve 70 is operated by expansion of a bellows 76, the interior of which is connected by conduit 78 to the delivery port 54 of the high-level control valve 48.

Figure 2:
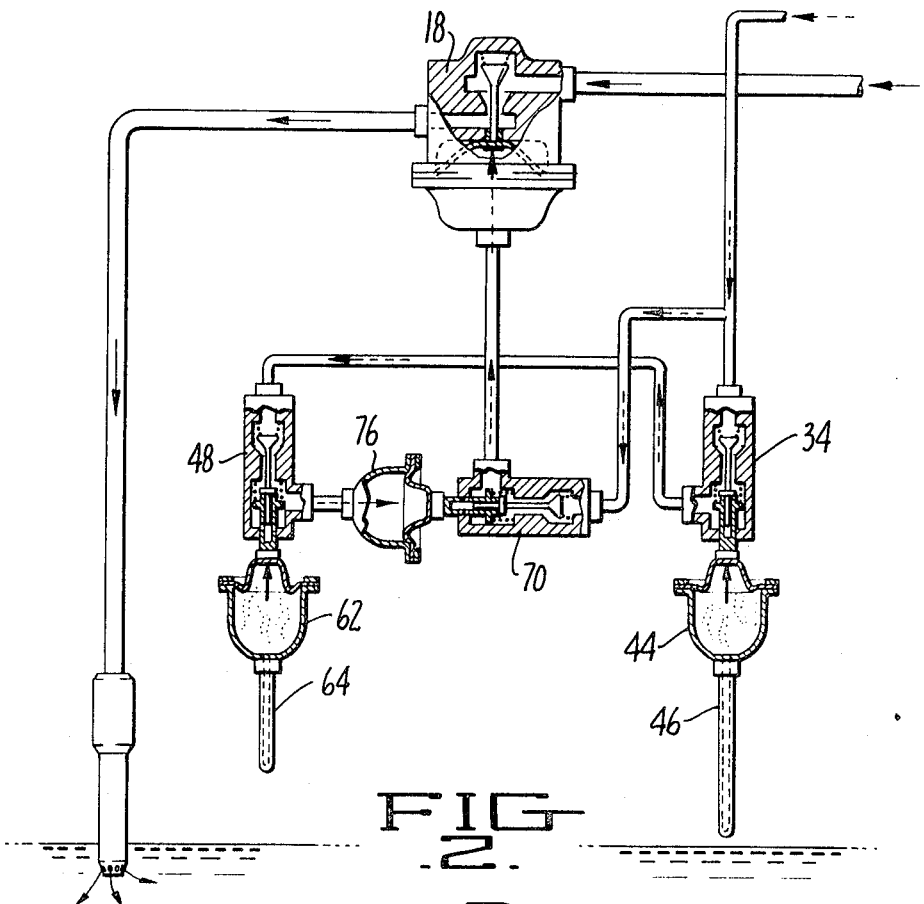
FIG. 2 is a view of the apparatus of FIG. 1 illustrating the condition of the apparatus of FIG. 1 when the liquid level in the container first falls to the minimum level.
Figure 3:
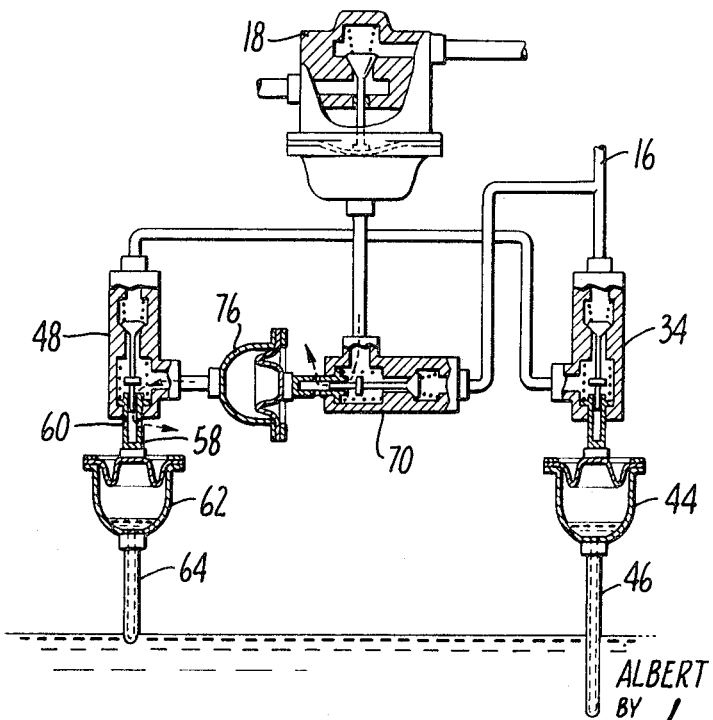
FIG. 3 is another view of the apparatus of FIG. 1 illustrating the condition of the apparatus when the liquid level in the container rises to the maximum liquid level at the conclusion of an incremental filling operation.

The operation of the control apparatus of this invention will be apparent from sequential examination of FIGS. 1-3. FIG. 1 illustrates the condition of the apparatus midway between two cycles of operation of the line valve 18. In this situation, the cryogenic liquid 12 has, at an earlier time, been filled to the high level 66 and has evaporated to some extent lowering the liquid level to a position midway between the high and low levels 66 and 68. In this situation, the valve 34 is closed so that no pressure is applied to bellows 76 through valve 48 even though valve 48 is open. Since no pressure is applied to bellows 76, the delivery valve 70 is closed venting the control port 32 of main line valve 18 through the vent ports 71 in the stem of delivery valve 70.

When at a later time, the cryogenic liquid 12 evaporates to the low liquid level 68, the liquid in bellows 44 vaporizes expanding the bellows and opening valve 34. Valve 48 has already been opened, and accordingly, pressurized fluid flows from line 16 through valve 34, line 52 and valve 48 to the bellows 76 opening the delivery valve 70. When delivery valve 70 opens, pressurized fluid flows from branch conduit 16 through delivery valve 70 to the control port 32 of the main line valve 18 opening main line valve 18 so that cryogenic liquid flows from the supply 10 through the main line valve 18 into the body of liquid 12 through nozzle 26. As this cryogenic liquid flows, it may cause evaporative cooling in the main line valve 18 which may tend to liquify gas adjacent to the control port 32; however, this does not permit the main line valve 18 to close since the control port 32 thereof is continuously repressurized by fluid flowing thereto through the delivery valve 70 from the branch conduit 16. This condition of the apparatus is illustrated in FIG. 2.

After a small amount of cryogenic liquid is delivered from the nozzle 26, the level of cryogenic liquid rises to an intermediate level between the levels 66 and 68 above the bottom of capillary tube 46 so that the start valve 34 closes. At this time the high-level control valve 48 has not yet closed, and accordingly a body of pressurized fluid is entrapped in the interior of valve 34, the conduit 52, the interior of valve 48, and the interior of bellows 76. This body of entrapped pressurized fluid holds the delivery valve 70 open so that further dispensing of cryogenic liquid through the valve 18 continues.

When the level of cryogenic liquid 12 rises to the high level 66 as illustrated in FIG. 3, the bellows 62 contracts permitting the valve 48 to close so that the interior of valve 48 is vented through the vent ports 60 thereby permitting bellows 76 to contract venting the interior of the delivery valve 70 so that valve 70 closes and pressure is relieved from the control port 32 of main line valve 18 stopping any further delivery of cryogenic liquid.

After this sequence of operation, further cryogenic liquid may boil off of the body of liquid 12 causing the bellows 62 to expand again to the original condition illustrated in FIG. 1, but since the conduit 52 is not pressurized by the closed valve 34, no further dispensing of cryogenic liquid will occur until the apparatus again assumes the condition of FIG. 2.

It should be noted that the provision in this apparatus of a closed and trapped volume of pressurized fluid in the conduit 52, bellows 76, and valve 48 might provide a potential safety hazard where the apparatus is constructed as illustrated in FIG. 1 with the branch conduit 16 connected to a supply of cryogenic liquid rather than a supply of pressurized gas. If this closed body of fluid were cryogenic liquid which boiled, the pressure in the closed system may rise substantially. In the apparatus of this invention, no safety hazard is provided since any rise in pressure in the closed cavity causes the pressure to rise inside valve body 34 so that the valve 40 will be unseated venting excess pressure into the branch line 16. In this way, the fluid pressure in the entire system is limited substantially to the pressure in supply line 14.

Figure 4:
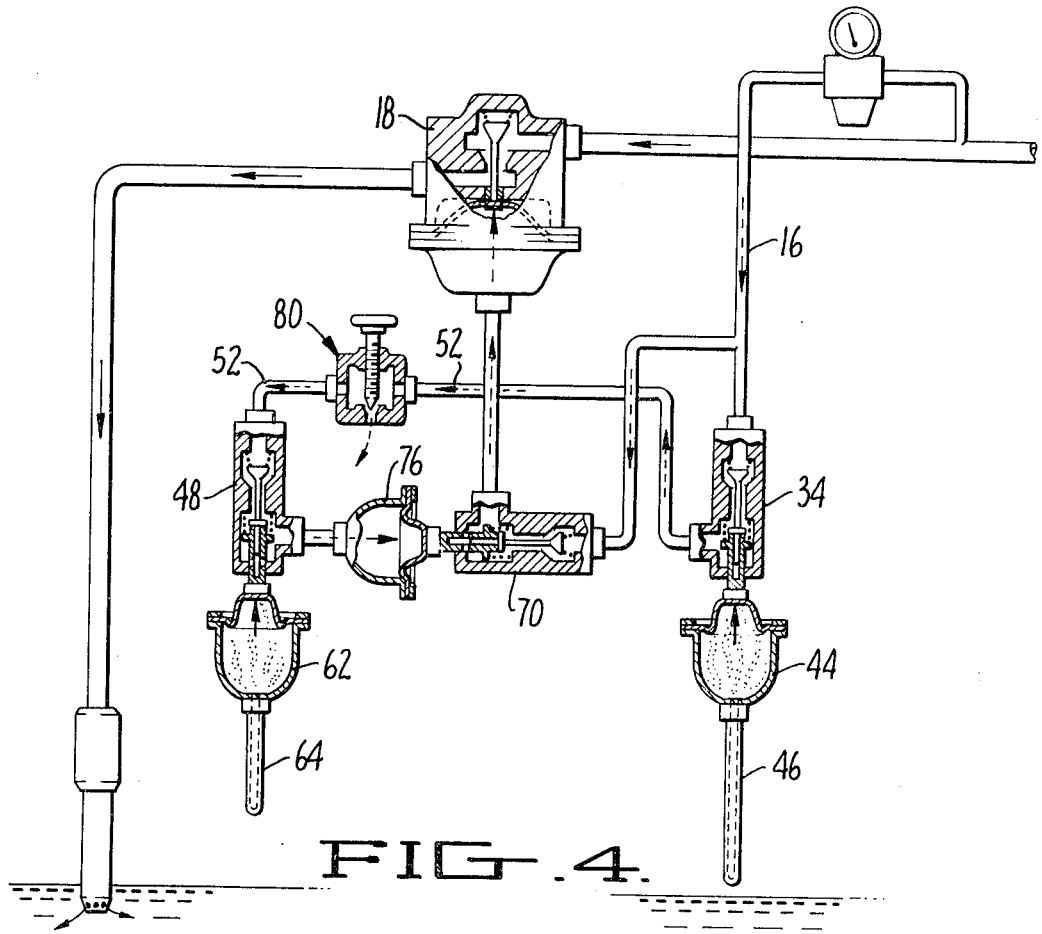
FIG. 4 is a view similar to FIG. 2 but showing an alternative form of the apparatus employing an adjustable metering valve for venting the entrapped body of fluid.

In the alternative form of apparatus shown in FIG. 4, an adjustable needle valve vent 80 is provided in the conduit 52 for metering fluid out of the entrapped body of pressurized fluid at a predetermined rate determined by the setting of the needle valve. Where the needle valve is adjusted to a closed position merely passing fluid through the conduit 52 without venting it, the apparatus of FIG. 4 operates in exactly the same way as the apparatus of FIGS. 1-3. The same is true where the needle valve 80 is partially opened but not opened enough to dissipate the pressure in bellows 76 before the liquid level reaches capillary tube 64.

When the valve 80 is further opened however, it acts as a timer control limiting the duration of each filling cycle after the start valve 34 is operated. In this situation, momentary opening of start valve 34 provides an entrapped body of pressurized fluid in the interior of valve 34, conduit 52, needle valve 80, valve 48, and bellows 76. This pressurized body causes bellows 76 to expand with resulting delivery of fluid through line 18, and fluid delivery continues until a sufficient amount of fluid is vented through needle valve 80 to permit bellows 76 to contract and close valve 70.

Figure 5:
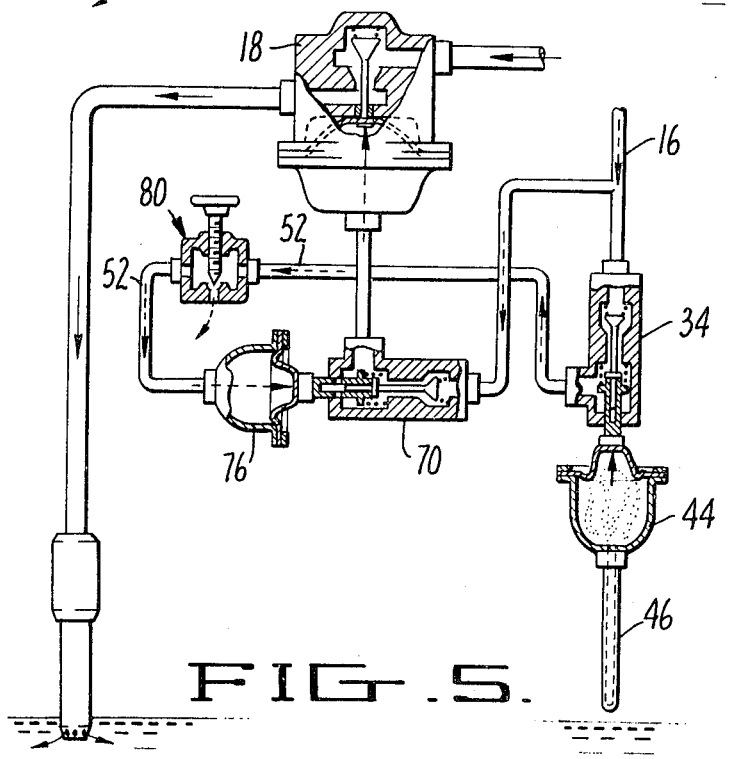
FIG. 5 is a similar view of another alternative form of the invention employing a low-level liquid sensor for starting a filling cycle and the adjustable metering valve for ending the cycle regardless of the level to which the cryogenic liquid rises.

A similar mode of operation occurs in the alternative form of apparatus shown in FIG. 5 where the conduit 52 containing the vent valve 80 is connected directly to the bellows 76 omitting the high-level control valve 48 and its temperature sensor. The apparatus of FIG. 5 operates automatically to deliver a stream of cryogenic liquid to the body of liquid 12 for a predetermined period of time without valve chatter every time the liquid level falls below capillary tube 46, and the time period for liquid delivery, and hence the volume of liquid delivered, can be adjusted by adjusting needle valve 80.

While certain features of the invention and some illustrative embodiments thereof have been illustrated and described in detail, it is obvious that many modifications thereof may be made without departing from the spirit and scope of the invention.

I claim:

1. Apparatus for dispensing cryogenic liquids from a pressurized supply source of such liquids which comprises:
   A. a pressure-responsive delivery valve having a discharge opening, a supply opening connected to said source, a control port, and means for connecting said delivery opening to said supply opening when fluid pressure is applied to said control port;
   B. a start valve having a supply opening connected to said supply source, a discharge opening communicating with said control port of said delivery valve, and valve means movable between a valve open position connecting said supply and discharge openings and a valve closed position disconnecting said supply and discharge openings without venting said discharge opening for establishing an entrapped body of pressurized fluid between said start valve and said control port when said start valve closes after opening; and,
   C. control means for venting said entrapped body of pressurized fluid; and
   D. temperature-responsive means having a sensor adapted to be positioned at a minimum level in a container to which said container is to be filled with liquid with said temperature responsive means having movable means connected to the valve means of said start valve for moving the valve means thereof to said valve closed position when the temperature of said sensor is maintained at the temperature of a cryogenic liquid.

2. The apparatus of claim 1 in which said control means comprises an adjustable metering valve for delivering fluid from said entrapped body of pressurized fluid at a predetermined rate.

3. Apparatus for dispensing cryogenic liquids from a pressurized supply source of such liquids which comprises:
   A. a pressure-responsive delivery valve having a discharge opening, a supply opening connected to said source, a control port, and means for connecting said delivery opening to said supply opening when fluid pressure is applied to said control port;
   B. a start valve having a supply opening connected to said supply source, a discharge opening communicating with said control port of said delivery valve, and valve means movable between a valve open position connecting said supply and discharge openings and a valve closed position disconnecting said supply and discharge openings without venting said discharge opening for establishing an entrapped body of pressurized fluid between said start valve and said control port when said start valve closes after opening; and,
   C. control means for venting said entrapped body of pressurized fluid;
in which said control means comprises:
   A. a high-level control valve having a supply opening connected to said discharge opening of said start valve, a discharge opening connected to said control port of said delivery valve, and valve means movable between a valve open position connecting said supply and discharge openings and a valve closed position closing said supply opening and venting said discharge opening, and;
   B. temperature-responsive means having a sensor adapted to be positioned at a maximum level in a container to which said container is to be filled with liquid with said temperature-responsive means having movable means connected to said valve means of said high-level control valve for moving the valve means thereof to said valve closed position when the temperature of said sensor is maintained at the temperature of a cryogenic liquid.

4. The apparatus of claim 3 characterized further by the inclusion of second temperature-responsive means having a sensor adapted to be positioned at a minimum level in a container to which said container is to be filled with liquid with said temperature-responsive means having movable means connected to the valve means of said start valve for moving the valve means thereof to said valve closed position when the temperature of said sensor is maintained at the temperature of a cryogenic liquid whereby said apparatus will operate automatically and incrementally to fill a container from said minimum level to said maximum level every time the cryogenic liquid level in said container falls below said minimum level.

5. The apparatus of claim 4 in which each of said temperature-responsive means consists of a contractable bellows positioned to move the valve means of the valve operated by said temperature-responsive means, a capillary tube having a closed end forming said sensor and an open end communicating with the interior of said bellows, and a body of gas filling said bellows and said capillary tube and having a boiling point which is lower than ambient temperature, but not lower than the boiling point of said cryogenic liquid.

6. The apparatus of claim 5 characterized further by the inclusion of a cryogenic liquid delivery conduit and a line valve having delivery opening connected to said delivery conduit, a supply opening connected to source, a control port connected to the discharge opening of said delivery valve, and means for connecting said delivery opening to said supply opening when fluid pressure is applied to said control port whereby fluid pressure at the control port of said line valve is not dissipated by evaporative cooling in said line valve, and no evaporative cooling is applied to said delivery valve to dissipate fluid pressure at the control port of said delivery valve.

7. Apparatus for dispensing cryogenic liquids from a pressurized supply source of such liquid which comprises:
   A. a pressure-responsive delivery valve having a discharge opening, a supply opening connected to said source, a control port, and means for connecting said delivery opening to said supply opening when fluid pressure is applied to said control port;
   B. a start valve having a supply opening connected to said supply source, a discharge opening communicating with said control port of said delivery valve, and valve means movable between a valve open position connecting said supply and discharge openings and a valve closed position disconnecting said supply and discharge openings without venting said discharge opening for establishing an entrapped body of pressurized fluid between said start valve and said control port when said start valve closes after opening;
   C. control means for venting said entrapped body of pressurized fluid; and
   D. a cryogenic liquid delivery conduit and a line valve having a delivery opening connected to said delivery conduit, a supply opening connected to source, a control port connected to the discharge opening of said delivery valve, and means for connecting said delivery opening to said supply opening when fluid pressure is applied to said control port whereby fluid pressure at the control port of said line valve is not dissipated by evaporative cooling in said line valve, and no evaporative cooling is applied to said delivery valve to dissipate fluid pressure at the control port of said delivery valve.

* * * * *